United States Patent Office 3,477,818
Patented Nov. 11, 1969

3,477,818
METHOD FOR THE DETERMINATION OF THE BILIRUBIN CONTENT OF BODY LIQUIDS
Rudolf Fried, Grunwald, near Munich, and Joachim Hoeflmayr, Munich, Germany, assignors to Dr. Heinz Haury Chemische Fabrik, Munich, Germany
No Drawing. Filed Feb. 14, 1967, Ser. No. 615,933
Claims priority, application Germany, Mar. 31, 1966, H 58,983
Int. Cl. G01n *31/22*
U.S. Cl. 23—230                                3 Claims

ABSTRACT OF THE DISCLOSURE

A new standard or comparison solution to be used in the photometric determination of the bilirubin content in body liquids such as serum and urine. According to the prior art, such standard solutions were extremely unstable while the standard solution of the present invention has a long life and is easily prepared. The standard or comparison solution to be used in the photometric determination of bilirubin is an aqueous solution of Evan's Blue of 0.2 to 1.0 mg. percent strength, the solution having a pH value of about between 5.5 to 7.5. The novel standard permits bilirubin determination in the more sensitive alkaline range.

DESCRIPTION OF THE INVENTION

This invention is concerned with a novel and particularly advantageous method for the determination of the bilirubin content in body liquids. The inventive method is particularly advantageously applicable for the ascertainment of the bilirubin content in serum and urine.

Bilirubin is the principal pigment of bile and a constituent of many biliary calculi. It is also found in blood serum (see the Merck Index, p. 149, 7th edition).

The evaluation of clinical-chemical analyses is oftentimes based and dependent on the photometric measuring of a colored solution, the coloring of the solution being the result of a reaction of the substance to be determined with a specific reagent. The photometric measuring of this colored solution is effected by a photometer, to wit, an instrument which is capable of measuring luminous intensity or brightness by comparison with a standard. A photometer may also be defined as an instrument which measures the extinction of monochromatic light caused by the liquid to be examined through which the light passes. In photometers in which the monochromatic light is obtained by means of a glass filter, the wave length of the light emanating from the filter is thus very much dependent on the nature of the filter. In addition to light of the wave length corresponding to the characteristic of the filter, the filter, to a lesser or greater extent, also permits the passage of light of adjacent wave lengths. It is thus evident that the exactness of the measurement of a colored solution in a photometer is very much dependent on the structure of the filter and, consequently, the measured value is more or less inexact or fluctuating.

In clinical-chemical photometric examinations it is therefore the practice, inter alia for the reasons mentioned above, to examine not only the sample or test solution, but also a standard solution of a known content of the substance to be determined. The measuring of the standard solution is thus used for comparison purposes and to a certain extent serves the purpose to calibrate the photometer instrument when it is used with a predetermined filter and at the prevailing conditions such as the available potential, etc.

It will be readily appreciated that a precondition for the reliable use of such standard solutions is their stability for a relatively long period of time. Specifically referring to the determination of the bilirubin content in solutions, it is known in the art that all known prior art standard solutions of this substance are stable for an extremely short period of time only. In fact, it is recognized that bilirubin-containing solutions are stable for a few minutes only and at the most about half an hour. This, of course, means that standard solution of bilirubin have to be measured immediately after preparation and, consequently, for each individual measurement which is to be compared with a standard, a fresh standard solution has to be prepared. This evidently is a very serious and undesired disadvantage.

It is a primary object of this invention to overcome the drawback referred to and to render it possible to provide bilirubin solutions which are stable for prolonged periods of time and thus can successfully be used as standards in photometric measurements.

Generally, it is an object of this invention to improve on the art of bilirubin determination in body liquids.

Several possibilities have been suggested for the photometric determination of the bilirubin content in body liquids. A known method for this purpose is based on the capability of bilirubin to be converted into a soluble azo dyestuff by means of diazotized sulfanilic acid. The amount of the soluble azo dyestuff in the solution is then photometrically determined by comparing it with a corresponding standard or comparison solution.

With a view to preparing a stable standard solution for this purpose, it has been suggested to replace the bilirubin in the standard by a solution of N (1-naphthyl) ethylenediaminechloride (see P. K. Bilisiss & R. J. Speer, Clin. Chem. 9, 554 (1963)). This compound also forms a red dye with diazotized sulfanilic acid, the absorption spectrum of the dye being very close to that of bilirubin in acidic solution. However, this previously proposed method has the disadvantage that the measurement of the azo dyestuff of N (1-naphthyl) ethylenediamine for the purpose of comparison with the azo dyestuff of the bilirubin in the solution to be measured, has to be effected in acidic solution. This is a disadvantage because measurements in an alkaline medium are, as is generally recognized, much more sensitive and can be effected in much more specific manner. The reason that the measurement cannot be effected at an alkaline pH value is that the absorption spectra of the two dyestuffs are no longer similar in the alkaline range.

Surprisingly it has now been ascertained that the previously mentioned capability of the bilirubin to form a soluble azo dyestuff by reaction with diazotized sulfanilic acid can be exploited, while at the same time carrying out the measurement in an alkaline medium and thus performing the measurement in a much more sensitive and specific manner with standard solutions which are extremely stable for a long period of time.

Briefly, and in accordance with this invention, it has been ascertained that an aqueous solution of Evan's Blue of 0.2–1.0 mg. percent strength and in a pH range of between about 5.5 to 7.5, has the same absorption spectrum in the ordinary measuring range of 570 to 600 nm. as an azo dyestuff solution of bilirubin at an alkaline pH. Such solution of Evan's Blue therefore can effectively and successfully be employed for calibrating a photometer to be used for bilirubin determination by means of the diazo method referred to, if the concentration of Evan's Blue solution is adjusted and compared with a freshly prepared true bilirubin standard.

The invention will now be described by an example, it being understood, however, that this example is given by way of illustration and not by way of limitation and that many changes may be effected without affecting in any way the scope and spirit of the invention as recited in the appended claims.

EXAMPLE

An Evan's Blue solution was adjusted for standard and comparison purposes in the photometric determination of the bilirubin content in body liquids as follows:

80 mg. of analytically pure bilirubin were dissolved in 20 ml. of 0.1 N sodium carbonate solution. 1.0 ml. of this solution were diluted with 8.0 ml. of a 5 percent albumin (human) solution and 1.0 ml. of 0.1 N acetic acid. This solution is again diluted with 5 percent albumin (human) solution to 100 ml. and accordingly contains 4 mg. percent of bilirubin. Immediately after the preparation, this standard or calibrating solution is reacted in known manner with diazotized sulfanilic acid and is brought into the alkaline pH range by the addition of Fehling's solution. The colored solution thus obtained is measured in an absolutely measuring photometer and its extinction is determined.

A solution of 2 mg. of Evan's Blue in 100 ml. of distilled water is adjusted to the same extinction by dilution with water. The solution corresponds to a standard of 4.0 mg. percent and, if desired, can be still further diluted.

While a specific embodiment of the invention has been shown and described in detail to illustrate the application of the inventive principles, it will be understood that the invention may be embodied otherwise without departing from such principles.

What is claimed is:

1. In a method of determining the bilirubin content of body liquids, wherein the bilirubin by means of diazotized sulfanilic acid is converted into a soluble azo dye and the amount of the azo dye is photometrically determined in an alkaline medium by comparison with a corresponding standard solution, the improvement which comprises that the standard solution is an aqueous solution of Evan's Blue, said Evan's Blue solution having a pH range of about 5.5 to 7.5.

2. The improvement of claim 1, wherein the Evan's Blue solution has a concentration of about 0.2 to 1.0 mg. percent.

3. The improvement as claimed in claim 1, wherein said body liquid is serum or urine.

References Cited

Allen, T. H., et al., Am. J. Physiol. 165, 205–214 (1951).

MORRIS O. WOLK, Primary Examiner

R. M. REESE, Assistant Examiner

U.S. Cl. X.R.

424—7